US012779999B2

(12) United States Patent
Grancharov et al.

(10) Patent No.: US 12,779,999 B2
(45) Date of Patent: Nov. 3, 2026

(54) METHOD AND DEVICE FOR DISPLAYING CONTENT IN VEHICLE

(71) Applicant: Telefonaktiebolaget LM Ericsson (publ), Stockholm (SE)

(72) Inventors: Volodya Grancharov, Solna (SE); Christopher Hollmann, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/149,748

(22) PCT Filed: Jan. 24, 2023

(86) PCT No.: PCT/EP2023/051713
§ 371 (c)(1),
(2) Date: Jul. 21, 2025

(87) PCT Pub. No.: WO2024/156343
PCT Pub. Date: Aug. 2, 2024

(65) Prior Publication Data
US 2026/0233610 A1 Aug. 13, 2026

(51) Int. Cl.

| | |
|---|---|
| ***B60K 35/29*** | (2024.01) |
| ***B60H 1/00*** | (2006.01) |
| ***B60K 35/10*** | (2024.01) |
| ***B60K 35/22*** | (2024.01) |
| ***B60N 2/56*** | (2006.01) |
| ***B60S 1/02*** | (2006.01) |

(Continued)

(52) U.S. Cl.
CPC ........... *B60K 35/29* (2024.01); *B60H 1/0065* (2013.01); *B60K 35/10* (2024.01); *B60K 35/22* (2024.01); *B60N 2/5678* (2013.01); *B60S 1/023* (2013.01); *G06F 3/011* (2013.01); *G06F 3/1423* (2013.01); *B60K 2360/1438* (2024.01); *B60K 2360/167* (2024.01)

(58) Field of Classification Search
CPC ........ B60K 35/29; B60K 35/10; B60K 35/22; B60K 2360/1438; B60K 2360/167; B60H 1/0065; B60N 2/5678; B60S 1/023; G06F 3/011; G06F 3/1423
See application file for complete search history.

(56) References Cited

U.S. PATENT DOCUMENTS

2007/0129864 A1* 6/2007 Tanaka .................. B60K 35/10 701/36
2008/0133122 A1* 6/2008 Mashitani ............. G01C 21/36 345/204

(Continued)

*Primary Examiner* — Antonio Xavier
(74) *Attorney, Agent, or Firm* — Murphy, Bilak & Homiller, PLLC

(57) ABSTRACT

A method is disclosed for displaying content on a first display and a second display. Both displays are arranged in a vehicle. The method is performed in a device and comprises receiving information on speed of the vehicle and information on a direction from which input is received by the first display; determining, based on the received information, whether content displayed in the first display should be displayed in the second display; and displaying, according to decision, the content on one or both of the first display and second display. A device is also provided, configured to perform the method.

18 Claims, 3 Drawing Sheets

(51) Int. Cl.
*G06F 3/01* (2006.01)
*G06F 3/14* (2006.01)

(56) References Cited

U.S. PATENT DOCUMENTS

| | | | | |
|---|---|---|---|---|
| 2008/0192024 | A1* | 8/2008 | Mita | B60K 35/10 345/173 |
| 2014/0062858 | A1* | 3/2014 | Yasumoto | B60K 35/10 345/156 |
| 2016/0370592 | A1* | 12/2016 | Mak | G06F 3/14 |
| 2017/0349099 | A1 | 12/2017 | Kunze et al. | |
| 2019/0079717 | A1 | 3/2019 | Lee et al. | |
| 2020/0142511 | A1 | 5/2020 | Watanabe | |
| 2023/0373496 | A1* | 11/2023 | Yamamoto | B60W 50/10 |

* cited by examiner

METHOD AND DEVICE FOR DISPLAYING CONTENT IN VEHICLE

TECHNICAL FIELD

The technology disclosed herein relates generally to the field of safety in vehicles and a method related thereto, and in particular to a device and method for displaying content on vehicle displays.

BACKGROUND

Vehicles are becoming increasingly advanced. Modern vehicles may, for instance, have two displays: a primary car display and a head-up display (HUD). The HUD is a transparent display presenting information in the usual field of vision of a driver. The primary displays are fairly large touch displays, enabling control of various things, such as air conditioning, radio, etc. The primary types of displays are easy to interact with, as they are placed in an easy to reach area between the driver's seat and a front passenger's seat. In contrast, the HUDs are typically small displays placed in the direction of the road, directly in front of the driver. These HUD-type of displays are essentially beyond driver's easy reach and projects typically only essential information on the windshield, such as navigation information.

The primary type of vehicle displays can present a lot of content and they are easy to interact with. However, at high speeds it is difficult—and highly undesirable—for the driver to interact with the primary display, as he then has to remove his gaze from the road. He may thereby pose a risk for himself, passengers in his vehicle and for nearby vehicles.

In view of the above, there is a need for improving safety of passengers in the vehicle, and also for passengers in nearby vehicles and nearby people outside.

SUMMARY

An objective of embodiments herein is to address and improve various aspects relating to safety in traffic. An objective is to improve safety for a driver of a vehicle and also passengers. A particular objective is to improve safety when using a primary display mounted in a vehicle while driving. These objectives and others are achieved by the methods, devices, computer programs and computer program products according to the appended independent claims, and by the embodiments according to the dependent claims.

These objective and others are accomplished by means for adaptively re-direct information content to a display that is the most suitable for the current conditions.

According to a first aspect there is presented a method for displaying content on a first display and a second display, both displays being arranged in a vehicle. The method may be performed in a device and comprises receiving information on speed of the vehicle and information on a direction from which input is received by the first display; determining, based on the received information, whether content displayed in the first display should be displayed in the second display; and displaying, according to decision, the content on one or both of the first display and the second display.

According to a second aspect there is presented a computer program for displaying content on a first display and a second display. The computer program comprises computer code which, when run on processing circuitry of a device, causes the device to perform a method according to the first aspect.

According to a third aspect there is presented a computer program product comprising a computer program as above, and a computer readable storage medium on which the computer program is stored.

According to a fourth aspect there is presented a device for displaying content on a first display and a second display, both displays being arranged in a vehicle. The device is configured to: receive information on speed of the vehicle and information on a direction from which input is received by the first display; determine, based on the received information, whether content displayed in the first display should be displayed in the second display; and display, according to decision, the content on one or both of the first display and second display.

Advantageously, these aspects enable an improved safety on roads, for drivers and passengers. Further, these aspects enable an improved utilization of displays in vehicles. Still further, these aspects simplify controlling of facilities in the vehicle, such as for instance adjusting an air conditioner.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Briefly, the present teachings provide, in various embodiments, a method and devices for increasing safety on roads, while also enabling an improved utilization of a vehicle's display(s).

Figure 1:
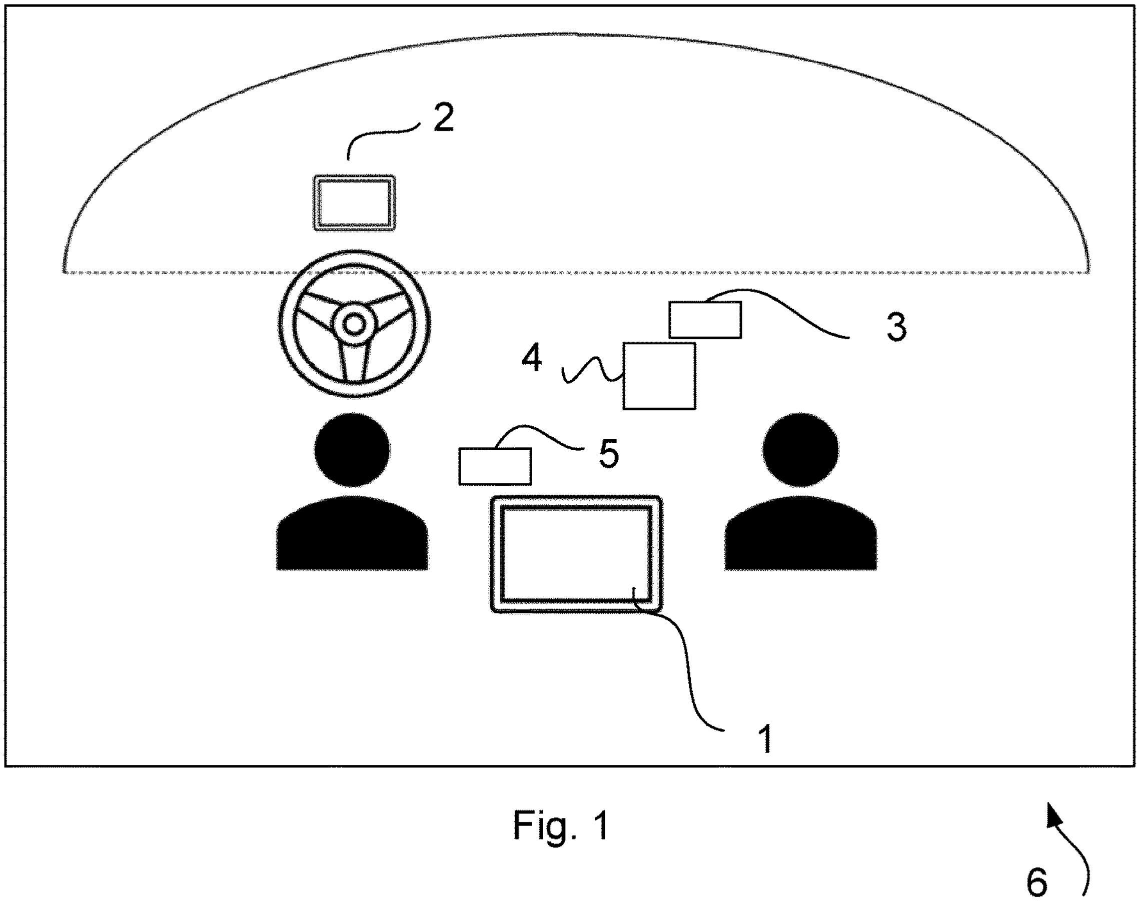
FIG. 1 illustrates a passenger interacting with a vehicle's primary display according to embodiments.

FIG. 1 illustrates schematically a relative placement of a head-up display 2 and primary vehicle display 1 (in the following denoted primary display). Typically, the primary display 1 is arranged on the dashboard (also denoted instrument panel) of a vehicle 6, between the driver and a front-seat passenger. The primary display 1 may comprise a touchscreen, by means of which the driver or—preferably—a front seat passenger may change settings such as temperature in the car, ventilation or radio controls.

The head-up display 2 is smaller, or even much smaller, than the primary display 1 but does not allow for direct user interaction. The head-up display 2 projects the content in the line of sight of the driver. Thereby, the head-up display 2 allows the driver to keep the gaze on the road, while consuming the content of the display 2. The content may, for instance, comprise current speed, warning signals, and indicator arrows for navigation. A typical head-up display is projected on the windshield of the vehicle 6 as a hologram or laser image.

A device 3 is provided for improving safety in the vehicle 6. This increase in safety is enabled in various ways. The device 3 receives information from a data-capturing device 5, for instance a camera, and possibly also information from the primary display 1. The device 3 is enabled to, based on the received information, determine from which direction the primary display 1 receives its input. That is, whether it is the driver's hand that is reaching out for the primary screen 1 or if it is the front-seat passenger's hand. Another important piece of information in this case is the speed at which the vehicle 6 travels. If the vehicle 6 is driven at high speed it is highly unsuitable that the driver reaches for the primary display 1, his/her both hands should obviously be on the driving wheel.

A switch logic 4 is also illustrated. In the FIG. 1 the switch logic 4 is illustrated as a separate part as of the device 3, but the switch logic 4 may be an integrated part of the device 3 or switch logic 4 may be connected to the device 3.

Based on the information about the direction from which the input is received by the primary screen (e.g., as captured by a camera) and on the speed, the device 3 may transfer content between the primary display 1 and the head-up display 2. These two pieces of information are required, but additional information could also be included in the decision on which display, or both, should be used for showing content.

Figure 2:
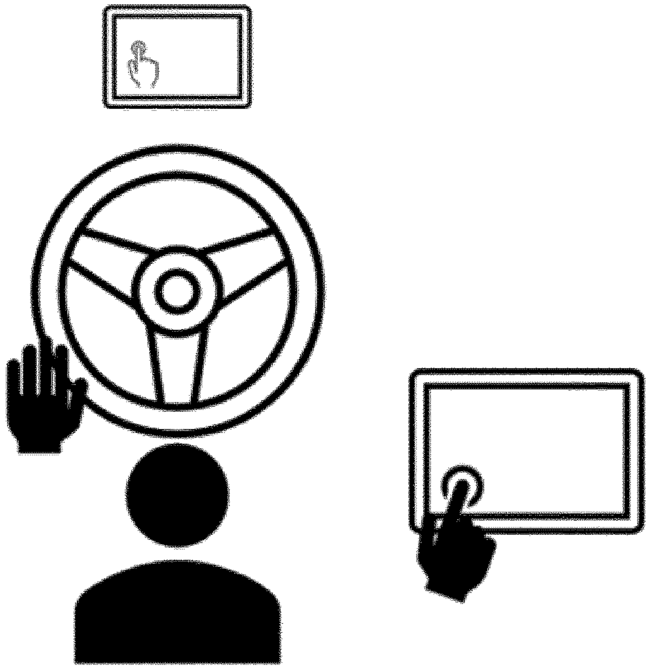
FIG. 2 illustrates schematically relative placement of a head-up display and primary display.

FIG. 2 illustrates a driver interacting with a vehicle's primary display according to embodiments. Next, a description of two modes is provided, which modes may be selected dynamically by the switch logic 4.

MODE_HUD:

In this mode (MODE_HUD), content and control may be transferred from the primary display 1 to the head-up display 2. If the driver puts his finger(s) on the primary display 1, then he is able to see, in the head-up display 2, the same content as in an area under his finger(s) at the primary display 1. Further, as illustrated in FIG. 2, at the head-up display 2 the driver is enabled to see the position of his/her finger(s). Thereby the driver does not have to move his gaze from the road in order to consume all the content. He is also enabled to interact with controls, which are actually at the primary display 1. The device 3 (switch-logic 4 thereof) enables such transfer.

MODE_PRI:

In this mode (MODE_PRI), the control and content stay at the primary display 1. In this case the head-up display 2 continues to display only its usual non-interactive content, relevant only for (for instance) car navigation. The primary display 1 control panel is not replicated at the head-up display 2. Thereby the driver or the front seat passenger can consume the information in the larger primary display 1 and interact with controls in a more comfortable way, as illustrated in and described next with reference to FIG. 3.

Figure 3:
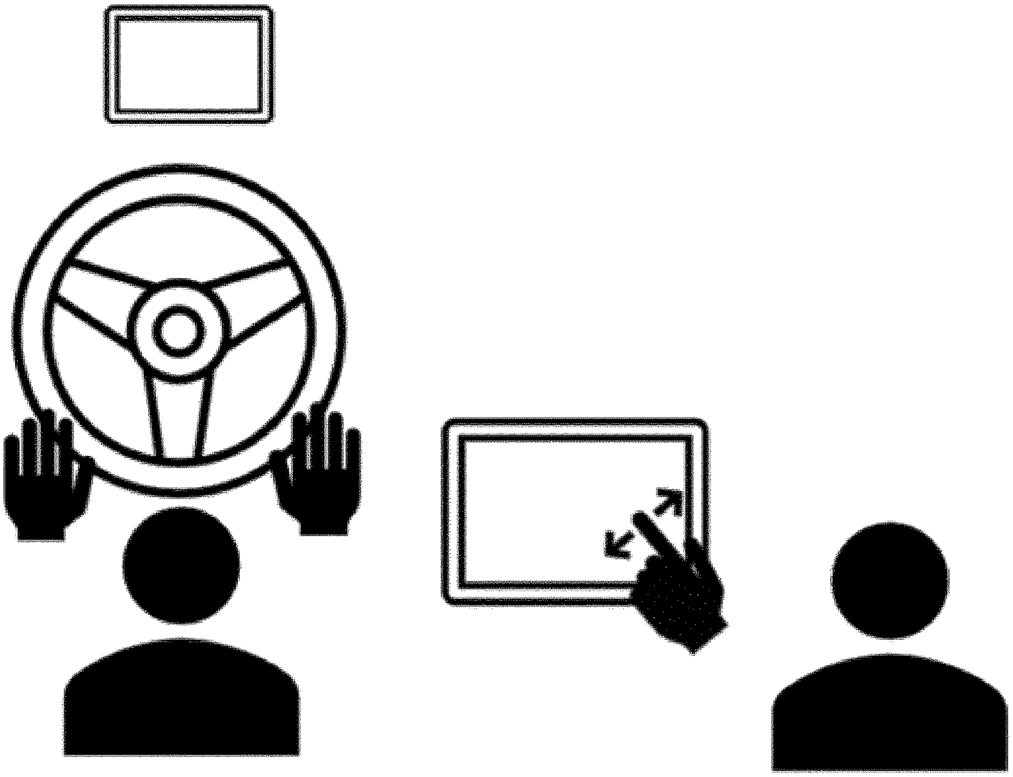
FIG. 3 illustrates a user interacting with a vehicle's displays according to embodiments.

FIG. 3 illustrates such an exemplary user interacting with the vehicle's 6 displays according to embodiments. Examples of preferred input parameters impacting decision on where to show content are given next.

A first type of input is the vehicle velocity v, i.e., the rate and direction of the vehicle's movement. In other embodiments, only the speed of the vehicle can be used, i.e., the time rate at which the vehicle is moving. The velocity (or only speed) is compared to a threshold θ, set, for instance, somewhere in the range of 10-15 km/h.

A second type of input is a parameter for detecting the driver's hand Ha as it approaches the primary display 1. The data-capturing device 5 may be used for such detection. When the data-capturing device 5 detects a hand, the parameter may be set to a value accordingly. The parameter may, for instance, be such that it takes the binary values $H_d$==TRUE or $H_d$==FALSE, wherein the value TRUE indicates that the hand is detected to be approaching the primary display 1.

An exemplary embodiment for implementing logic for switching between the MODE_HUD and the MODE_PRI is:

```
IF v<θ
  mode=MODE_PRI
ELSE IF v≥θ
  IF Hd==TRUE
    mode=MODE_HUD
  ELSE
    mode=MODE_PRI
  END
END
```

It is essential for the decision logic to discriminate the driver's hand Ha from the hand of passenger on the front seat Hp. Hand detection may, in an exemplary embodiment, be implemented with the use of a camera capturing area in front of the primary display 1, a camera capturing the hand as it approaches. An object tracker may be applied to estimate a trajectory of the detected hand. Based on the trajectory of the moving hand the device 3 may determine if the hand belongs to the driver or to the front seat passenger.

The switching logic preferably continuously reads the input parameters and updates the decision based on the latest update. For instance, the device 3 is in MODE_PRI. As long as the driver's hand is not positioned in front of the primary display 1, the device 3 will remain in MODE_PRI. When the driver's hand is detected to be in front of the primary display 1, the device 3 switches to and then remain in mode MODE_HUD. In some embodiments this always happens upon detecting the driver's hand in from of the primary display 1. However, in other embodiments, the device 3 switches to MODE_HUD only if a set parameter(s) (e.g., velocity) are met. For instance, if the vehicle 6 is moving with high speed and the driver's hand is detected in front of the primary display 1, the mode will switch from MODE- _PRI to MODE_HUD. That is, the MODE_HUD is activated at high-speed and in case the driver is making an attempt to interact with the control buttons of the primary screen 1. In this case part of the content of the primary screen 1 is transferred to the head-up screen 2. In still further embodiments, the position of driver's hand is also projected on the head-up screen 2.

Figure 4:
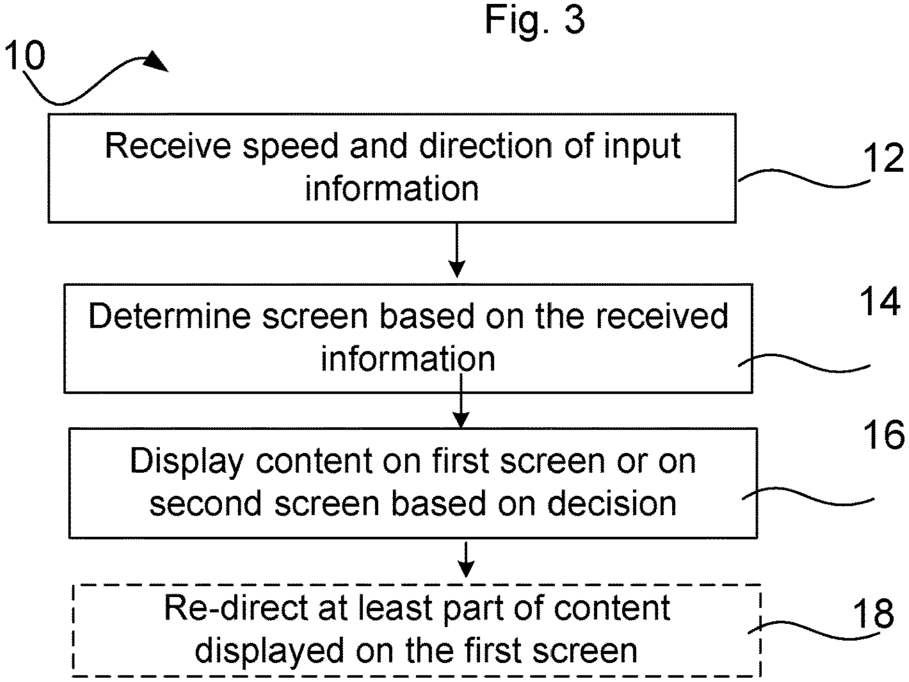
FIG. 4 is a flowchart of various embodiments of a method.

FIG. 4 is a flowchart of various embodiments of a method 10. The method 10 is provided for displaying content on a first display 1 and a second display 2, both of which are arranged in a vehicle 6, such as, for instance, a car. The method 10 is performed in a device 3, which has been described earlier.

The method 10 comprises receiving 12 information on speed of the vehicle 6 and information on a direction from which input is received by the first display 1. The device 3 is enabled to receive information from one or more data-capturing devices, as has been exemplified by a camera and object tracker. Such reception of data may be through wired or wireless communication between the devices.

The method 10 comprises determining 14, based on the received information, whether content displayed in the first display 1 should be displayed in the second display 2.

The method 10 comprises displaying 16, according to the decision in the previous step, the content on one or both of the first display 1 and the second display 2. As has been described, the device 3 may be arranged to show selectable information on the second display 2. In case the driver's hand has been detected to approach the primary screen 1, the content thereon or part of the content thereon is displayed also on the second display 2. Exemplary content to be shown also on the second display 2, particularly if the vehicle has a high velocity, comprise speed, part of the users hand and control buttons (e.g., radio, temperature etc.).

The method 10 provides a number of advantages. For instance, the method enables an improved safety on roads, for drivers as well as for any passengers, by taking into account who is handling the primary display. Further, these aspects enable an improved utilization of displays in vehicles. Still further, these aspects simplify controlling of facilities in the vehicle, such as for instance adjusting an air conditioner.

In an embodiment, the method 10 comprises displaying 18 at least part of the content displayed on the first display 1 also on the second display 2. The content may be displayed when some predefined criteria are fulfilled. In this embodiment, these criteria comprise that the speed of the vehicle 6 is above a set speed threshold, and that the direction from which the input is received indicates that the input is coming from a driver of the vehicle 6.

In variations of the above embodiment, the at least part of the displayed content on the second display 2 comprises a position of a driver's hand and part of the content of the first display 1 beneath the position of the driver's hand. In some embodiments, a visualization of at least part of the driver's hand is shown in the second display 2 at a position corresponding to the position of the driver's hand on the first display 1.

In various embodiments, the information on the direction from which input is received comprises: receiving data on an area in front of the first display 1, wherein the data is captured by a data capturing device 5, such as a camera; detecting, by an object tracker, a moving hand in the captured area and estimating a trajectory thereof; and determining, based on the estimated trajectory, the direction from which the input is received.

In variations of the above embodiment, the method 10 comprises determining, based on the determined direction, whether it is a front seat passenger or a driver that interacts with the first display 1.

In various embodiments, the displayed content comprises at least an interactive control means. In different embodiments, the interactive control means is arranged to control one or more of: activation of heated seats, increase of interior temperature, switching of a defroster, change of radio channel; resetting of a trip computer and setting of instrumentation lights.

In various embodiments, the receiving 12 comprises receiving information on the speed of the vehicle 6 from a speedometer thereof.

In various embodiments, the first display 1 is a touch display arranged between a driver and a front seat passenger of the vehicle 6.

In various embodiments, the second display 2 is a head-up display arranged in the view field of a driver of the vehicle 6.

A device 3 is also disclosed, the device 3 comprising means for displaying content on a first display 1 and a second display 2, wherein both displays are arranged in a vehicle, such as, for instance, a car or truck. The device 3 may be configured to implement any of the embodiments of the method 10 that have been described.

The device 3 is configured to receive information on speed of the vehicle 6 and information on a direction from which input is received by the first display 1. The device 3 is further configured to determine, based on the received information, whether content displayed in the first display 1 should be displayed in the second display 2; and configured to display, according to decision, the content on one or both of the first display 1 and second display 2.

In an embodiment, the device 3 is configured to display at least part of the content displayed on the first display 1 also on the second display 2. The device 3 is configured to effectuating this displaying when some criteria are fulfilled, in particular when the speed of the vehicle 6 is above a set speed threshold, and the direction from which the input is received indicates the input coming from a driver of the vehicle 6.

In variations of the above set of embodiments, the at least part of the displayed content on the second display comprises a position of a driver's hand and part of the content of the first display 1 beneath the position of the driver's hand.

In variations of the above set of embodiments, a visualization of at least part of the driver's hand is shown in the second display 2 at a position corresponding to the position of the driver's hand on the first display 1.

In variations of the above set of embodiments the device 3 is configured to receive the information on the direction from which input is received by receiving data on an area in front of the first display 1; the data being captured by a data capturing device 5; detecting, by an object tracker, a moving hand in the captured area and estimating a trajectory thereof; and determining, based on the estimated trajectory, the direction from which the input is received.

In variations of the above embodiments, the device 3 is configured to determine, based on the determined direction, whether it is a front seat passenger or a driver that interacts with the first display 1.

In various embodiments, the displayed content comprises at least an interactive control means. In such embodiments, the device 3 may be configured to control the interactive control means, which in turn controls one or more of: activation of heated seats, increase of interior temperature, switching of a defroster, change of radio channel, resetting of a trip computer and setting of instrumentation lights.

In various embodiments, the device 3 is configured to receive by receiving information on the speed of the vehicle 6 from a speedometer thereof.

Figure 5:
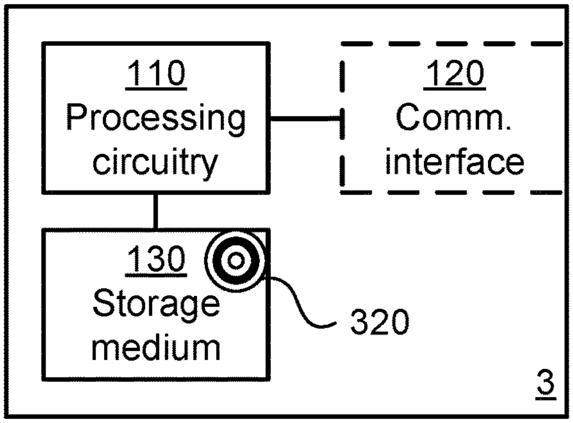
FIG. 5 is a schematic diagram showing functional units of a device according to an embodiment.

FIG. 5 schematically illustrates, in terms of a number of functional units, the components of a device 3 according to an embodiment. Processing circuitry 110 is provided using any combination of one or more of a suitable central processing unit (CPU), multiprocessor, microcontroller, digital signal processor (DSP), etc., capable of executing software instructions stored in a computer program product 330 (as in FIG. 7), e.g., in the form of a storage medium 130. The processing circuitry 110 may further be provided as at least one application specific integrated circuit (ASIC), or field programmable gate array (FPGA).

Particularly, the processing circuitry 110 is configured to cause the device 3 to perform a set of operations, or actions, as disclosed above. For example, the storage medium 130 may store the set of operations, and the processing circuitry 110 may be configured to retrieve the set of operations from the storage medium 130 to cause the device 3 to perform the set of operations. The set of operations may be provided as a set of executable instructions. The processing circuitry 110 is thereby arranged to execute methods as herein disclosed.

The storage medium 130 may also comprise persistent storage, which, for example, can be any single one or combination of magnetic memory, optical memory, solid state memory or even remotely mounted memory.

The device 3 may further comprise a communications interface 120 for communications with other entities, functions, nodes, and devices, over suitable interfaces. As such the communications interface 120 may comprise one or more transmitters and receivers, comprising analogue and digital components.

The processing circuitry 110 controls the general operation of the device 3 e.g., by sending data and control signals to the communications interface 120 and the storage medium 130, by receiving data and reports from the communications interface 120, and by retrieving data and instructions from the storage medium 130. Other components, as well as the related functionality, of the device 3 are omitted in order not to obscure the concepts presented herein.

Figure 6:
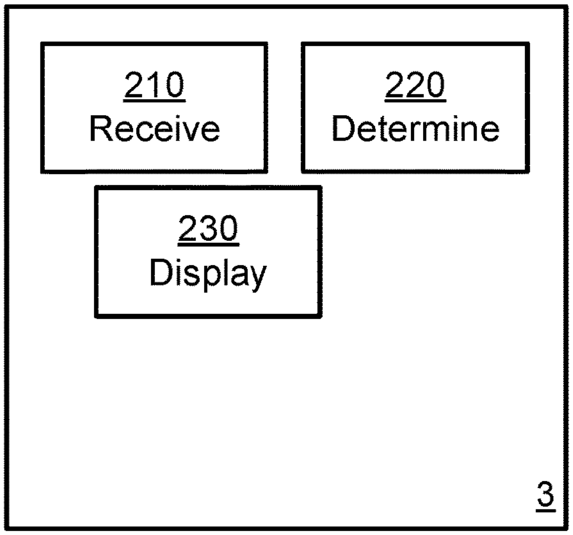
FIG. 6 is a schematic diagram showing functional modules of a device according to an embodiment.

FIG. 6 schematically illustrates, in terms of a number of functional modules, the components of a device 3 according to an embodiment. The device 3 of FIG. 6 comprises a number of functional modules; a receive module 210 configured to receive information on speed of the vehicle and information on a direction from which input is received by the first display, a determine module 220 configured to determine, based on the received information, whether content displayed in the first display should be displayed in the second display; and a display module 230 configured to display, according to decision, content on one or both of the first display and second display. The device 3 of FIG. 6 may further comprise a number of optional functional modules, for performing any of the steps of the method as disclosed. In general terms, each functional module 210-230 may be implemented in hardware or in software. Preferably, one or more or all functional modules 210-230 may be implemented by the processing circuitry 110, possibly in cooperation with the communications interface 120 and the storage medium 130. The processing circuitry 110 may thus be arranged to from the storage medium 130 fetch instructions as provided by a functional module 210-230 and to execute these instructions, thereby performing any actions of the device 20 as disclosed herein.

Figure 7:
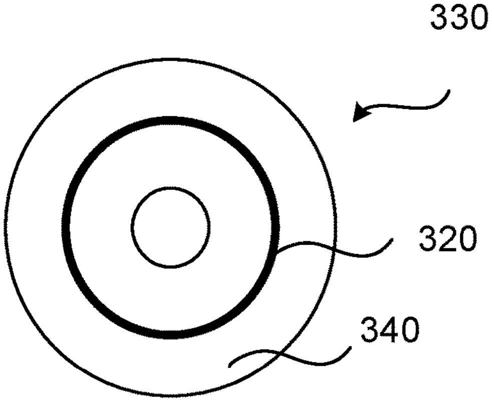
FIG. 7 shows one example of a computer program product comprising computer readable means according to an embodiment.

FIG. 7 shows one example of a computer program product 330 comprising computer readable means 340. On this computer readable means 340, a computer program 320 can be stored, which computer program 320 can cause the processing circuitry 110 and thereto operatively coupled entities and devices, such as the communications interface 120 and the storage medium 130, to execute methods according to embodiments described herein. The computer program 320 and/or computer program product 330 may thus provide means for performing any actions of the device 3 as herein disclosed.

In the example of FIG. 7, the computer program product 330 is illustrated as an optical disc, such as a CD (compact disc) or a DVD (digital versatile disc) or a Blu-Ray disc. The computer program product 330 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 330.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for displaying content on a first display and a second display, both displays being arranged in a vehicle, the method being performed in a device and comprising:
- receiving information on speed of the vehicle and information on a direction from which input is received by the first display,
- determining, based on the received information, whether content displayed in the first display should be displayed in the second display, and
- displaying, according to the determination, the content on one or both of the first display and second display;
- wherein the at least part of the displayed content on the second display comprises a position of a driver's hand and part of the content of the first display beneath the position of the driver's hand.

2. The method of claim 1, comprising displaying at least part of the content displayed on the first display also on the second display when:
- the speed of the vehicle is above a set speed threshold, and
- the direction from which the input is received indicates the input coming from a driver of the vehicle.

3. The method of claim 1, wherein a visualization of at least part of the driver's hand is shown in the second display at a position corresponding to the position of the driver's hand on the first display.

4. The method of claim 1, wherein the information on the direction from which input is received comprises:
- receiving data on an area in front of the first display, the data being captured by a data capturing device,
- detecting, by an object tracker, a moving hand in the captured area and estimating a trajectory thereof, and determining, based on the estimated trajectory, the direction from which the input is received.

5. The method of claim 4, comprising determining, based on the determined direction, whether it is a front seat passenger or a driver that interacts with the first display.

6. The method of claim 1, wherein the displayed content comprises at least an interactive control interface.

7. The method of claim 6, wherein the interactive control interface is arranged to control one or more of:

activation of heated seats, increase of interior temperature, switching of a defroster, change of radio channel;

resetting of a trip computer and setting of instrumentation lights.

8. The method of claim 1, wherein the receiving comprises receiving information on the speed of the vehicle from a speedometer thereof.

9. The method of claim 1, wherein the first display is a touch display arranged between a driver and a front seat passenger of the vehicle.

10. The method of claim 1, wherein the second display is a head-up display arranged in the view field of a driver of the vehicle.

11. A device for displaying content on a first display and a second display, both displays being arranged in a vehicle, the device comprising processing circuitry and memory operatively coupled to the processing circuitry, the memory storing program instructions whereby the device is configured to:

receive information on speed of the vehicle and information on a direction from which input is received by the first display, determine, based on the received information, whether content displayed in the first display should be displayed in the second display, and display, according to the determination, the content on one or both of the first display and second display;

wherein the at least part of the displayed content on the second display comprises a position of a driver's hand and part of the content of the first display beneath the position of the driver's hand.

12. The device of claim 11, further configured to display at least part of the content displayed on the first display also on the second display when:

the speed of the vehicle is above a set speed threshold, and the direction from which the input is received indicates the input coming from a driver of the vehicle.

13. The device of claim 12, wherein a visualization of at least part of the driver's hand is shown in the second display at a position corresponding to the position of the driver's hand on the first display.

14. The device of claim 11, configured to receive the information on the direction from which input is received by:

receiving data on an area in front of the first display, the data being captured by a data capturing device, detecting, by an object tracker, a moving hand in the captured area and estimating a trajectory thereof, and determining, based on the estimated trajectory, the direction from which the input is received.

15. The device of claim 14, configured to determine, based on the determined direction, whether it is a front seat passenger or a driver that interacts with the first display.

16. The device of claim 11, wherein the displayed content comprises at least an interactive control interface.

17. The device of claim 16, wherein the device is configured to control interactive control interface, which in turn controls one or more of:

activation of heated seats, increase of interior temperature, switching of a defroster, change of radio channel;

resetting of a trip computer and setting of instrumentation lights.

18. The device of claim 11, configured to receive by receiving information on the speed of the vehicle from a speedometer thereof.

* * * * *